US 6,718,256 B1

(12) United States Patent
Holmes et al.

(10) Patent No.: US 6,718,256 B1
(45) Date of Patent: Apr. 6, 2004

(54) METHOD FOR IDENTIFYING AN OPERATING STATE OF AN ENGINE SOAK TIMER

(75) Inventors: John William Holmes, Eastpointe, MI (US); Lynn Edward Davison, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 09/682,671

(22) Filed: Oct. 4, 2001

(51) Int. Cl.⁷ .............................................. G06F 19/00
(52) U.S. Cl. .................... 701/113; 374/145; 123/41.12; 123/179.24; 123/198 D
(58) Field of Search ........................... 123/41.04, 41.05, 123/41.12, 41.13, 179.4, 179.24, 198 D; 701/35, 101, 102, 113, 115; 374/145

(56) References Cited

U.S. PATENT DOCUMENTS

| 4,723,523 | A | | 2/1988 | Kataoka et al. | |
|---|---|---|---|---|---|
| 5,482,013 | A | * | 1/1996 | Andrews et al. | 123/179.21 |
| 5,566,546 | A | | 10/1996 | Rumpsa et al. | |
| 5,566,745 | A | * | 10/1996 | Hill et al. | 165/299 |
| 5,727,384 | A | | 3/1998 | Ma | |
| 5,995,889 | A | * | 11/1999 | Eisenhour | 701/36 |
| 6,169,942 | B1 | | 1/2001 | Miller et al. | |
| 6,393,357 | B1 | * | 5/2002 | Holmes et al. | 701/115 |

* cited by examiner

Primary Examiner—Willis R. Wolfe
Assistant Examiner—Johnny H. Hoang
(74) Attorney, Agent, or Firm—Dykema Gossett; Carlos L. Hanze

(57) ABSTRACT

A method for determining the existence of a "short time" type state within a vehicle control assembly 10. The method requires the measurement of the temperature 59 of engine coolant 16 at a first time 61 and the determination and/or the inferential creation of the temperature 60 of the engine coolant 16 at a second and later time 62. A "short time" type state is identified when the temperature 60 at the second time 62 is greater than or equal to the temperature 59 at the first time 61.

10 Claims, 2 Drawing Sheets

METHOD FOR IDENTIFYING AN OPERATING STATE OF AN ENGINE SOAK TIMER

BACKGROUND OF INVENTION

The present invention generally relates to a method for identifying a certain state or condition of an engine soak timer and more particularly, to a method which identifies a "short time" type state or condition of an engine soak timer by the use of an engine coolant temperature signature.

A soak timer is used within a vehicular control assembly to determine the amount of time that an engine, such as an internal combustion engine, has been deactivated. Particularly, the information which is provided by the timer is used to determine whether the engine has remained inoperative for a sufficient period of time in order to allow several diagnostic tests, such as a fuel vapor emission test which requires the engine and associated components and constituent materials to be relatively cool, to be conducted.

A "short time" state, within the soak timer, causes the soak timer to erroneously determine that the engine has ceased operation for a period less than the period necessary to allow these tests to be properly conducted, thereby substantially always preventing these tests from being accomplished. The term "state" as used in this application means a certain condition of the soak timer.

While some attempts have been made to detect the occurrence of a "short time" state within a soak timer, these attempts are relatively complicated, are relatively costly, and are not reliable.

SUMMARY OF INVENTION

It is a first non-limiting advantage of the present invention to provide a method for identifying a "short time" state within a vehicle control assembly in a manner which overcomes some or all of the previously delineated disadvantages of prior methods.

It is a second non-limiting advantage of the present invention to provide a method for identifying a "short time" state within a vehicle control assembly in a manner which overcomes some or all of the previously delineated disadvantages of prior methods and which, by way of example and without limitation, utilizes an engine coolant temperature signature.

It is a third non-limiting advantage of the present invention to provide a method for identifying a "short time" state within a vehicle control assembly in a manner which overcomes some or all of the previously delineated disadvantages of prior methods and which, by way of example and without limitation, inferentially creates a temperature value and uses the inferentially created temperature value along with a previously measured and/or created temperature value to identify the existence of a "short time" state.

According to a first non-limiting aspect of the present invention, a method for identifying the existence of a short time state within a controller assembly is provided. The method includes the steps of determining a first temperature at a first time; determining a second temperature at a second time; comparing the first and the second temperatures; and ascertaining the existence of the short time state by use of the comparison.

According to a second non-limiting aspect of the present invention, a method for identifying the existence of a certain state within a vehicle control assembly is provided. The method includes the steps of creating a signature; determining the temperature of material resident within a vehicle; using the signature to create a value; comparing the created value with the previously determined temperature; and identifying the existence of the state based upon the comparison.

These and other aspects, features, and advantages of the present invention will become apparent from a reading of the following detailed description of the preferred embodiment of the invention and by reference to the following drawings.

DETAILED DESCRIPTION

Figure 1:
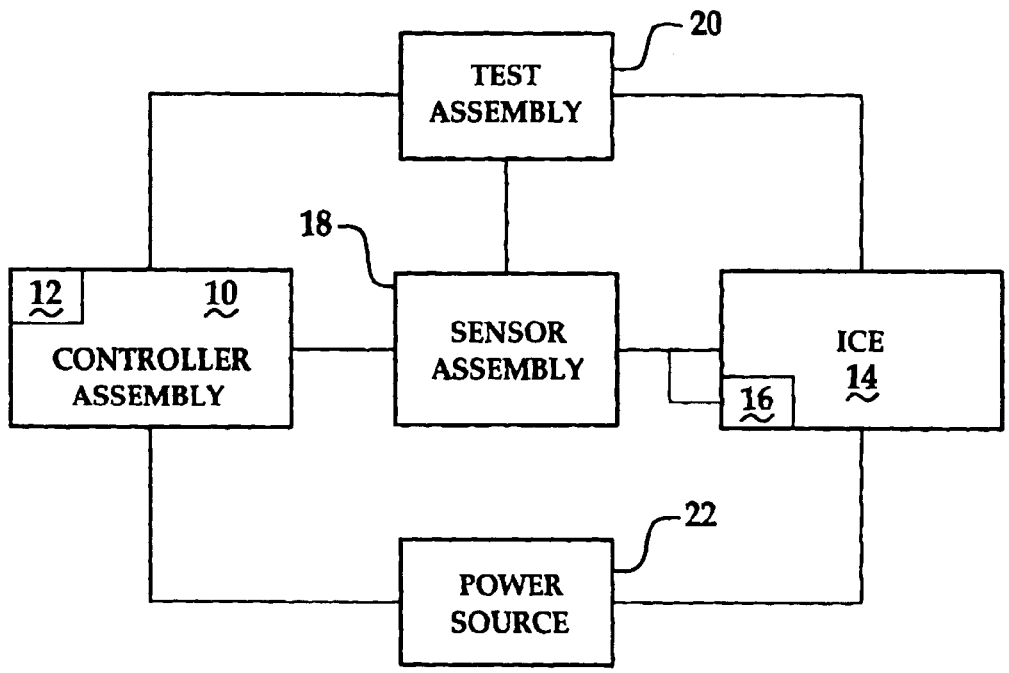
FIG. 1 is a block diagram of a vehicle control assembly which is made in accordance with the teachings of the preferred embodiment of the invention in combination with a sensor assembly, a test assembly, and an internal combustion engine.

Referring now to FIG. 1, there is shown a vehicle control assembly 10 which is made in accordance with the teachings of the preferred embodiment of the invention and which is operable under stored program control. In one non-limiting embodiment, vehicle control assembly 10 comprises a microprocessor, application specific integrated circuit, or processor array.

As further shown, controller assembly 10 is adapted to operate in combination with an internal combustion engine 14 of the type having coolant 16. The controller assembly 10 includes a soak timer portion 12 which may be manifested as software, hardware, and/or firmware and which is operatively effective to determine the amount of time during which the internal combustion engine 14 was inoperable or "turned off".

More particularly, controller assembly 10 is operatively coupled to a sensor assembly 18. As shown, sensor assembly 18 is coupled to the coolant 16 and to the internal combustion engine 14 and is, in one non-limiting embodiment, adapted to determine the temperature of the coolant 16. Sensor assembly 18 may also may be selectively adapted to sense other events or properties of the internal combustion engine 14. Further, controller assembly 10 is operatively coupled to a test assembly 20 which is coupled to the internal combustion engine 14 and which is adapted to selectively perform various tests, such as a fuel vapor emission test, when the internal combustion engine 14 has been inoperable for a certain period of time. Hence, controller assembly 10, in one non-limiting embodiment, causes the test assembly 20 to perform these certain tests once the controller assembly 10 has determined that the internal combustion engine 14 has been deactivated for at least a certain amount of time. Controller assembly 10 is also operatively coupled to a source of electrical power 22 which may comprise the vehicle battery and which may be operatively coupled to the internal combustion engine 14.

Figure 2:
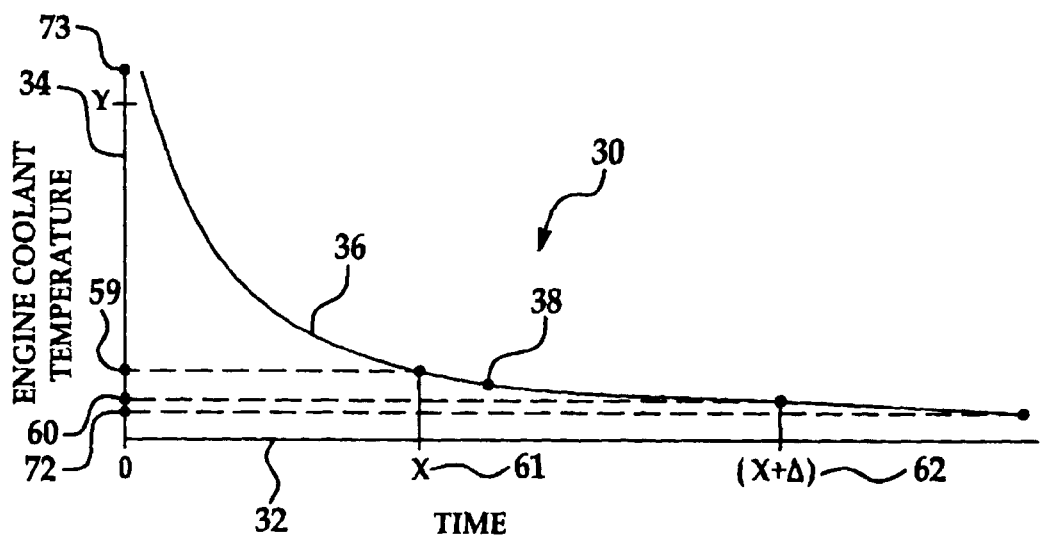
FIG. 2 is a graph which illustrates the relationship between time and engine coolant temperature when the engine is "off" or deactivated and which graphically comprises an engine coolant temperature signature.
Figure 3:
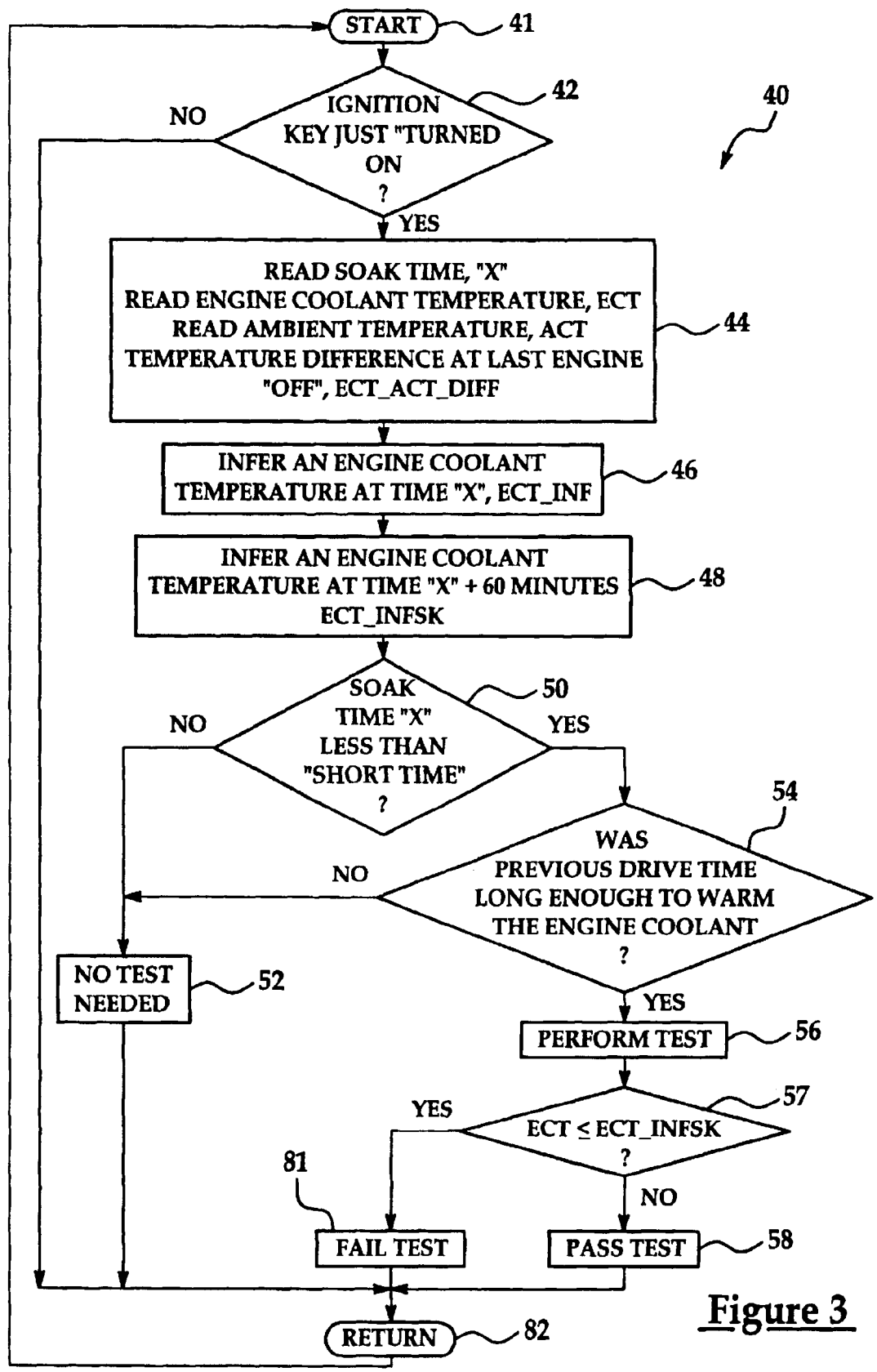
FIG. 3 is a flow chart which illustrates the methodology of the preferred embodiment of the invention.

In operation, at least one engine coolant temperature signature is created and is stored within the controller assembly 10. One non-limiting example of such an engine coolant temperature signature is graphically shown by and/or is represented by the graph 30 of FIG. 2.

Particularly, an engine coolant temperature signature 30 comprises the relationship between time and coolant temperature (e.g., the manner in which the coolant 16 cools or "loses heat" over time from a first maximum or attained coolant or engine temperature 73 to an ambient temperature 72). Typically, an engine coolant signature has a general exponential "shape" or function. For example, within graph 30, values of time are plotted along axis 32 and values of coolant temperature are plotted along axis 34. The resultant curve 36 contains and/or is created by several points, such as point 38, which cooperatively represent the relationship between these two values (e.g., each point, such as point 38 upon the curve 36, has a corresponding temperature and a time value). Hence, curve 36 graphically illustrates the manner in which the engine coolant 16 is cooled or "loses heat" over some period of time. The information represented by the curve 36 may be selectively stored within the controller assembly 10.

In another non-limiting embodiment of the invention, various engine coolant signatures are created by and stored within the vehicle controller assembly 10 for various ambient temperature values 72 and for various maximum attained engine temperatures 73 since an engine coolant signature is dependent upon the highest temperature 73 which is attained by the engine 14 or coolant 16 and the ambient temperature 72. That is, vehicle controller assembly 10, in this one non-limiting embodiment, stores several engine coolant temperature signatures, each of the stored engine coolant temperature signatures having a unique ambient temperature value 72 and a unique maximum attained engine temperature value 73. The ambient temperature and the maximum or attained engine coolant temperature values are "read" from the sensor assembly 18 and communicated to the controller assembly 10, effective to allow the controller assembly 10 to select an appropriate and previously stored engine coolant temperature signature (e.g., one having a substantially and an identical ambient temperature 72 and a maximum attained engine temperature value 73 as the respectively sensed and received values) for use in the methodology of the preferred embodiment of the invention. Alternatively, only one such engine coolant temperature signature is stored within the controller assembly 10 and is used to produce other signatures, by interpolation, when the sensed ambient temperature and maximum attained engine values do not exactly correspond to the respective values included within the stored engine coolant temperature signature.

In the preferred embodiment of the invention, the controller assembly 10 performs the methodology which is represented by flow chart 40 after one or more engine coolant temperature signatures are stored within the controller assembly 10.

Particularly, methodology 40 begins with an initial step 41 in which the controller assembly 10 prepares to perform the methodology 40. Step 42 follows step 41 and, in step 42, controller 10 determines whether the ignition has just been "turned" (e.g., whether the engine 14 has "just" been activated or as been activated within some predetermined period of time such as six seconds). If the engine has not "just" been activated, the controller assembly 10 enters step 82 and returns to steps 41 and 42 to continue to ascertain whether the ignition has just been "turned" and/or whether the internal combustion engine 14 has just been "activated".

Alternatively, step 42 is followed by step 44 in which the controller assembly 10 measures the temperature of the internal combustion engine 14 (i.e., ECT, the temperature of the engine coolant 16), the engine "off time" 61 which is denoted as "x", the ambient temperature 72, and the difference between the engine temperature and the ambient temperature at the time that the engine was "shutdown", by the use of sensor assembly 18. In one embodiment, the time 61 occurs just after the engine activation is sensed by the controller assembly 10 and represents the amount of sensed/calculated "soak time".

Step 44 is followed by step 46 in which the parameters or values which were sensed/calculated in step 44 are used by the controller assembly 10 to select one of the previously stored engine coolant temperature signatures having the measured ambient temperature 72 and/or the measured coolant temperature 73. Alternatively, in this step 46, the controller assembly 10 creates a signature by interpolation. The controller assembly 10 then, in this non-limiting embodiment, uses the calculated and/or determined the amount of time that has elapsed since the engine was "turned off" (e.g., denoted as "x" in FIG. 2) in combination with the selected/created engine coolant signature to inferentially create the engine or coolant temperature 59 associated with this time 61. The term "inferential" means that the temperature 59 is "read" from the signature or inferred by use of the signature.

Step 46 is followed by step 48 and, in this step 48, the controller assembly 10 adds a certain amount of time (e.g., about sixty minutes) to the time 61, thereby specifying a second and later time 62. Further, in step 48, the controller assembly 10 utilizes the selected or created engine coolant temperature signature, which is graphically shown by way of example and without limitation in FIG. 2, to inferentially create a second temperature 60 of the engine 14 or the engine coolant 16 at this distant time 62. That is, the value of the second temperature 62 is "inferentially" created (e.g., is "read from" the utilized engine coolant signature) at the distant time 62 which is shown as "x+Δ").

Step 50 follows step 46, and, in this step 50, the controller assembly 10 determines whether the amount of the "soak time" 61 (e.g., the time denoted as "x") is less than a previously defined and stored "short time". If the amount of the "soak time" is greater than the amount of "short time", step 50 is followed by step 52 in which the controller assembly 10 determines that no state test is needed. Step 52 is followed by the "return" step 82, which causes the controller assembly 10 to enter step 41.

Alternatively, step 50 is followed by step 54 in which the controller assembly 10 determines whether the vehicle was driven for a sufficient time in order to adequately warm the internal combustion engine 14. Such a determination may be made by the sensor assembly 18 and communicated to the controller assembly 10. If a sufficient amount of time has not elapsed, step 54 is followed by step 52. Alternatively, step 54 is followed by step 56 in which the controller assembly 10 performs the state analysis or state identification test of the preferred embodiment of the invention.

That is, in step 56, the controller assembly compares the second inferentially created temperature 60 at the distant time 62 (e.g., at a time which is substantially equal to "x+=b 60 =1 minutes") to the measured ECT temperature 59 from block 44. Step 57 follows step 56 and, in this step 57, the controller assembly 10 determines whether a "short time" state exists within the controller assembly 10 by determining whether the second coolant temperature 60 is greater than or greater than or equal to the first temperature 59. If the second temperature 60 is greater than or equal to the first temperature 59, then step 57 is followed by step 81 in which the state is declared to exist, and/or in which some other state indication is provided (e.g., a light assembly is selectively illuminated). Alternatively, step 57 is followed by step 58 in which a "pass" state is declared, and/or some other indication is provided (e.g., a light assembly is selectively extinguished or a "state flag" is cleared). Steps 81 and 58 are followed by step 82.

It is to be understood that the invention is not limited to the exact construction or method which has been illustrated and discussed above, but that various changes may be made without departing from the spirit and the scope of the inventions as are delineated in the following claims. It should be appreciated that the foregoing methodology provides a reliable and relatively uncomplicated method for determining the existence for a "short time" type state within the controller assembly 10. It should be further appreciated that the foregoing methodology may be manifested within software which is resident within the controller assembly 10, thereby allowing the foregoing methodology to cost effectively achieve the desired objective of identifying a "short time" state within a vehicle control assembly.

What is claimed is:

1. A method for use by a vehicle control assembly of the type having a soak timer and adapted for use in combination with an internal combustion engine, said method being effective to ascertain the existence of a short time state within the soak timer, said method comprising the steps of determining whether the engine has been recently activated; creating a cooling signature for a certain material; measuring the temperature of said certain material at a first time; inferring the temperature of said certain material at a second time by use of said cooling signature; comparing said measured temperature and said inferred temperature; and identifying the existence of said short time state by use of said comparison.

2. The method of claim 1 wherein said certain material comprises engine coolant.

3. The method of claim 1 wherein said second time is later than said first time.

4. The method of claim 1 wherein said short time state is identified only if said measured temperature at said second time is greater than said inferred temperature at said first time.

5. The method of claim 4 wherein said comparison is made only if said engine has been recently activated.

6. The method of claim 5 wherein said second time is about one hour later than said first time.

7. The method of claim 1 further comprising the steps of creating a plurality of cooling signatures; and selecting said cooling signature from said plurality of cooling signatures.

8. The method of claim 7 wherein said cooling signature is selected by use of an ambient temperature.

9. The method of claim 8 wherein said cooling signature is selected by use of an engine coolant temperature.

10. The method of claim 9 further comprising the step of providing an indication upon the identification of said existence of said short time state.

* * * * *